(12) United States Patent
Kaida et al.

(10) Patent No.: US 10,260,401 B2
(45) Date of Patent: Apr. 16, 2019

(54) METHOD OF DETERMINING ARRANGEMENT POSITION OF SPHERICAL JOINT FOR CONNECTING EXHAUST PIPES TO EACH OTHER IN EXHAUST SYSTEM, AND EXHAUST SYSTEM

(71) Applicant: OILES CORPORATION, Tokyo (JP)

(72) Inventors: Hidetoshi Kaida, Fujisawa (JP); Yukito Matsumoto, Fujisawa (JP); Shoichiro Fujita, Fujisawa (JP); Shunya Oda, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 7 days.

(21) Appl. No.: 15/526,077

(22) PCT Filed: Nov. 16, 2015

(86) PCT No.: PCT/JP2015/082159
§ 371 (c)(1),
(2) Date: May 11, 2017

(87) PCT Pub. No.: WO2016/084646
PCT Pub. Date: Jun. 2, 2016

(65) Prior Publication Data
US 2017/0314450 A1    Nov. 2, 2017

(30) Foreign Application Priority Data

Nov. 28, 2014  (JP) ................. 2014-242576

(51) Int. Cl.
*F01N 3/00* (2006.01)
*F01N 13/18* (2010.01)
(Continued)

(52) U.S. Cl.
CPC .......... *F01N 13/1883* (2013.01); *B60K 13/04* (2013.01); *F01N 1/00* (2013.01);
(Continued)

(58) Field of Classification Search
USPC .......... 60/274, 305, 312, 313, 322, 323, 324
See application file for complete search history.

(56) References Cited

U.S. PATENT DOCUMENTS

| | | | | |
|---|---|---|---|---|
| 5,944,363 A | * | 8/1999 | Cwik | F01N 13/1811 285/226 |
| 8,434,588 B2 | * | 5/2013 | Matsueda | B60K 13/04 181/206 |

(Continued)

FOREIGN PATENT DOCUMENTS

| | | |
|---|---|---|
| CN | 1390717 | 1/2003 |
| CN | 1392920 | 1/2003 |

(Continued)

OTHER PUBLICATIONS

Search Report issued in EP Appln. No. 15862879.2 dated Jun. 6, 2018.

(Continued)

*Primary Examiner* — Binh Q Tran
(74) *Attorney, Agent, or Firm* — Nixon & Vanderhye P.C.

(57) ABSTRACT

Provided are a method for determining the disposition position of a spherical joint for coupling exhaust pipes to each other in an exhaust system, and an exhaust system, which enable engine vibrations to be more effectively damped. In the present invention, strain gauges are attached at a plurality of locations in an exhaust system (1), simulated vibrations which simulate engine vibrations are imparted to the upstream-side end of the exhaust system (1), and bending strain is measured at each strain gauge. On the basis of the bending strain measured at each strain gauge, detected is a position at which generated is a bending moment that is equal to or greater than or equal to a torque amount which generates a maximum static friction force between a spherical inner-circumferential surface (26) and a spherical outer-circumferential surface (27) of a spherical joint (2) which (Continued)

come into contact with each other, and the detected position is determined to be the disposition position for the spherical joint (2).

6 Claims, 4 Drawing Sheets

(51) Int. Cl.
    *B60K 13/04*    (2006.01)
    *F01N 13/08*    (2010.01)
    *F01N 1/00*    (2006.01)
    *F16L 27/04*    (2006.01)

(52) U.S. Cl.
    CPC .......... *F01N 13/08* (2013.01); *F01N 13/1811* (2013.01); *F16L 27/04* (2013.01); *F01N 2260/00* (2013.01)

(56) References Cited

U.S. PATENT DOCUMENTS

| | | | |
|---|---|---|---|
| 2004/0135366 A1* | 7/2004 | Sasada | F01N 13/1811 285/49 |
| 2006/0185924 A1 | 8/2006 | Kobayashi et al. | |
| 2008/0084065 A1* | 4/2008 | Ogimura | F16L 27/1012 285/369 |
| 2009/0159147 A1* | 6/2009 | Yamaguchi | B60K 13/04 138/155 |
| 2010/0154397 A1* | 6/2010 | Brinkmeyer | F01N 13/1811 60/324 |

FOREIGN PATENT DOCUMENTS

| | | |
|---|---|---|
| CN | 1233924 | 12/2005 |
| CN | 1842641 | 10/2006 |
| JP | 8-218863 | 8/1996 |
| JP | 10-266850 | 10/1998 |
| JP | 2002-371841 | 12/2002 |
| JP | 2006-9753 | 1/2006 |
| JP | 3812369 | 8/2006 |
| JP | 2007-99102 | 4/2007 |
| JP | 2009-13869 | 1/2009 |
| JP | 2011-127450 | 6/2011 |
| WO | WO 93/04270 | 3/1993 |
| WO | WO 2006/000811 | 1/2006 |

OTHER PUBLICATIONS

International Search Report for PCT/JP2015/082159, dated Jan. 26, 2016, 4 pages.
Search Report issued in CN Appln. No. 2015800620473 dated Nov. 6, 2018 (w/ translation).

* cited by examiner

METHOD OF DETERMINING ARRANGEMENT POSITION OF SPHERICAL JOINT FOR CONNECTING EXHAUST PIPES TO EACH OTHER IN EXHAUST SYSTEM, AND EXHAUST SYSTEM

This application is the U.S. national phase of International Application No. PCT/JP2015/082159 filed 16 Nov. 2015, which designated the U.S. and claims priority to JP Patent Application No. 2014-242576 filed 28 Nov. 2014, the entire contents of each of which are hereby incorporated by reference.

TECHNICAL FIELD

The present invention relates to an exhaust system for discharging exhaust gas of an engine of an automobile or the like, and in particular to a method of determining arrangement positions of spherical joints, each of which is placed in the middle of an exhaust system and connects exhaust pipes to each other to reduce vibration transmitted from an engine to an automobile body.

BACKGROUND ART

Among exhaust systems for automobile or the like, there is known an exhaust system in which a spherical joint for connecting exhaust pipes to each other is placed in the middle of the exhaust system, to prevent transmission of vibration from an engine to an automobile body via a mounter (such as a muffler hanger made of rubber) for mounting the exhaust system to the automobile body. For example, the Patent Literature 1 discloses an exhaust system for discharging exhaust gas of an engine mounted transversely in the front of a vehicle, from the rear of the vehicle, in which an exhaust pipe of the exhaust system has apart extending generally straight in the longitudinal direction of the vehicle and a part extending generally straight in the width direction of the vehicle, with each part of the exhaust pipe being provided with a spherical joint. According to this exhaust system, vibration in the vertical direction of the vehicle can be damped by the spherical joint placed in the exhaust pipe's part that extends generally straight in the longitudinal direction of the vehicle, and vibration in the longitudinal direction of the vehicle can be damped by the spherical joint placed in the exhaust pipe's part that extends generally straight in the width direction of the vehicle.

CITATION LIST

Patent Literature

Patent Literature 1: Japanese Unexamined Patent Application Laid-Open No. 8-218863

SUMMARY OF INVENTION

Technical Problem

In a spherical joint, sliding between the spherical inner peripheral surface and the spherical outer peripheral surface contacting with each other occurs in the case of application of the bending moment larger than or equal to the torque such that the maximum static friction force is generated between the spherical inner peripheral surface and the spherical outer peripheral surface. The friction accompanying this sliding dissipates vibration energy, to damp vibration transmitted from one of the member having the spherical inner peripheral surface and the member having the spherical outer peripheral surface to the other.

In the case that a spherical joint is placed at a position where upstream side and downstream side of the exhaust system move in synchronization with each other in the vertical direction, in the width direction, or in the longitudinal direction, sometimes there is not generated bending moment larger than or equal to the torque of generating the maximum static friction force between the spherical inner peripheral surface and the spherical outer peripheral surface that are components of the spherical joint and contact with each other, even if vibration is large in that position. In that case, the spherical inner peripheral surface and the spherical outer peripheral surface do not slide relative to each other, and as a result the vibration cannot be damped. In the conventional exhaust system using spherical joints, this situation is does not considered.

The present invention has been made considering the above situation, and an object of the invention is to provide a method of determining arrangement positions of spherical joints used for connecting exhaust pipes in an exhaust system and to provide an exhaust system, so that vibration transmitted from an engine to an automobile body can be reduced more efficiently.

Solution to Problem

To solve the above problem, the present invention places a spherical joint in an exhaust system at a position at which application of prescribed vibration to the exhaust system (for example, vibration supposed of the engine to be mounted on the automobile or the like employing this exhaust system) generates the bending moment larger than or equal to the torque of generating the maximum static friction force between a spherical inner surface and a spherical outer surface that are components of the spherical joint and contact with each other.

For example, the present invention provides a method of determining an arrangement position of a spherical joint that connects exhaust pipes to each other in an exhaust system for discharging exhaust gas of an engine, comprising:

detecting a position in the exhaust system, a spherical inner peripheral surface and a spherical outer peripheral surface being components of the spherical joint, a bending moment at the position being generated larger than or equal to a torque of generating a maximum static friction force between the spherical inner peripheral surface and the spherical outer peripheral surface in contact with each other upon prescribed vibration being applied to an upstream end of the exhaust system; and determining the detected position to be the arrangement position of the spherical joint in the exhaust system.

Here, strain gauges may be attached to a plurality of portions of the exhaust system; and the position, at which generated is the bending moment larger than or equal to the torque of generating the maximum static friction force between the spherical inner peripheral surface and the spherical outer peripheral surface that are components of the spherical joint and contact with each other, is detected based on bending strains measured by the respective strain gauges when simulated vibration that simulates vibration of the engine is applied to an upstream end of the exhaust system. Or, Computer Aided Engineering (CAE) analysis may be used to obtain a stress distribution at a time of applying simulated vibration that simulates vibration of the engine to the upstream end of the exhaust system, and the position, at which generated is the bending moment larger than or equal to the torque of generating the maximum static friction force between the spherical inner peripheral surface and the outer peripheral surface that are components of the spherical joint and contact with each other, is detected based on the obtained stress distribution.

Further, the present invention provides an exhaust system for discharging exhaust gas of an engine, the exhaust system comprising:

a plurality of exhaust pipes; and a spherical joint connecting the exhaust pipes with each other; and the spherical joint placed at a position, a spherical inner peripheral surface and a spherical outer peripheral surface being components of the spherical joint, a bending moment at the position being generated larger than or equal to a torque of generating a maximum static friction force between the spherical inner peripheral surface and the spherical outer peripheral surface in contact each other upon prescribed vibration being applied from the engine to the exhaust system.

Advantageous Effects of Invention

According to the present invention, a spherical joint is placed at a position at which generated is a bending moment larger than or equal to the torque of generating the maximum static friction force between a spherical inner peripheral surface and a spherical outer peripheral surface that are components of the spherical joint and contact with each other, when prescribed vibration is applied from the engine to the exhaust system. Accordingly, it is possible to generate more sliding between the inner peripheral surface and the outer peripheral surface of the spherical joint. As a result, it is possible to reduce more efficiently the vibration transmitted from the engine to the body of the automobile or the like via the exhaust system.

DESCRIPTION OF EMBODIMENT

In the following, one embodiment of the present invention will be described.

An arrangement position determining method according to the present embodiment determines suitable positions for arranging spherical joints 2 to damp vibration transmitted from an engine in an exhaust system 1 of an automobile or the like.

Figure 1:
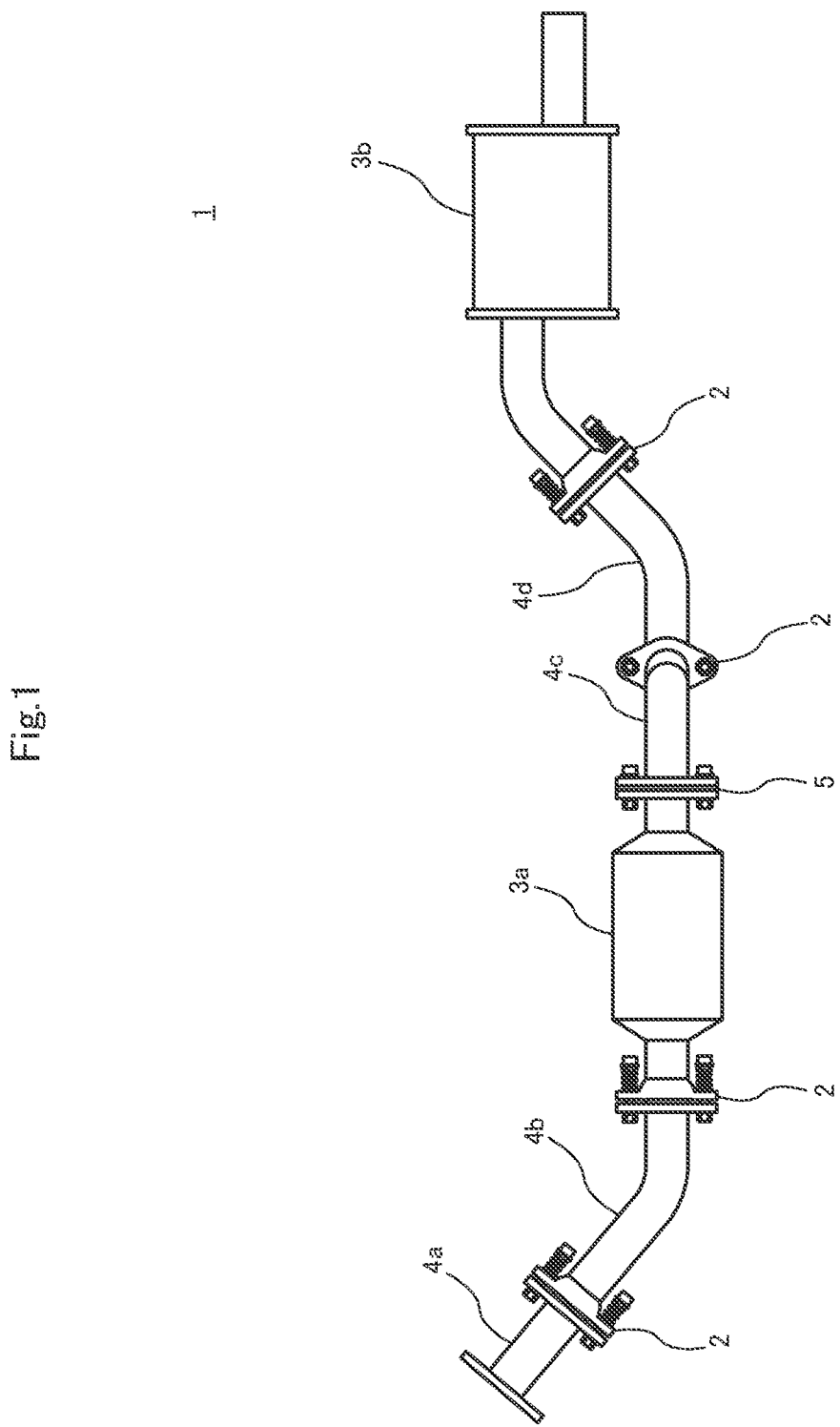
FIG. 1 is a schematic view showing an exhaust system 1 in which spherical joints 2 are placed at positions determined by an arrangement position determining method according to one embodiment of the present invention.

FIG. 1 is a schematic view showing the exhaust system 1 with the spherical joints 2 arranged at positions determined by the arrangement position determining method of the present embodiment.

As shown in the figure, the exhaust system 1 comprises: a center muffler 3a placed in the center of a body (not shown) of the automobile or the like on which the exhaust system 1 is mounted and a rear muffler 3b placed in the rear of the body (hereinafter, these are also referred to simply as mufflers 3); a plurality of exhaust pipes 4a-4d (hereinafter, these are also referred to simply as exhaust pipes 4), which are arranged between the engine (not shown) of the automobile or the like on which the exhaust system 1 is mounted and the center muffler 3a and between the center muffler 3a and the rear muffler 3b, for discharging exhaust gas of the engine from the rear muffler 3b via the center muffler 3a; and the spherical joints 2 each arranged between a muffler 3 and an exhaust pipe 4 or between exhaust pipes 4.

In the exhaust system 1 shown in FIG. 1, the spherical joints 4 are arranged at four positions, i.e. a position between the exhaust pipe 4a and the exhaust pipe 4b, a position between the exhaust pipe 4b and the center muffler 3a, a position between the exhaust pipe 4c and the exhaust pipe 4d, and a position between the exhaust pipe 4d and the rear muffler 3b. The arrangement positions and the number of the spherical joints 2 are determined based on the arrangement position determining method of the present embodiment, and are not limited to the example shown in FIG. 1. At a position where a spherical joint 2 is not placed between a muffler 3 and an exhaust pipe 4 or between exhaust pipes 4 (in FIG. 1, a position between the center muffler 3a and the exhaust pipe 4c), a rigid coupling 5 is placed. Instead of using the rigid coupling 5, both pipes may be welded or may be formed as one unit. Although this exhaust system 1 has the two mufflers 3a, 3b and the four exhaust pipes 4a-4d, this configuration is suitably changed depending on the automobile or the like on which this exhaust system 1 is mounted.

Based on the arrangement position determining method of the present embodiment, each of the spherical joints 2 is placed at a position at which generated is bending moment larger than or equal to the torque such that the maximum static friction force is generated between the spherical inner peripheral surface 26 and the spherical outer peripheral surface 27 (See FIG. 2) that are components of the spherical joint 2 and contact with other, among positions between individual muffler 3 and exhaust pipe 4 and positions between exhaust pipes 4.

Figure 2:
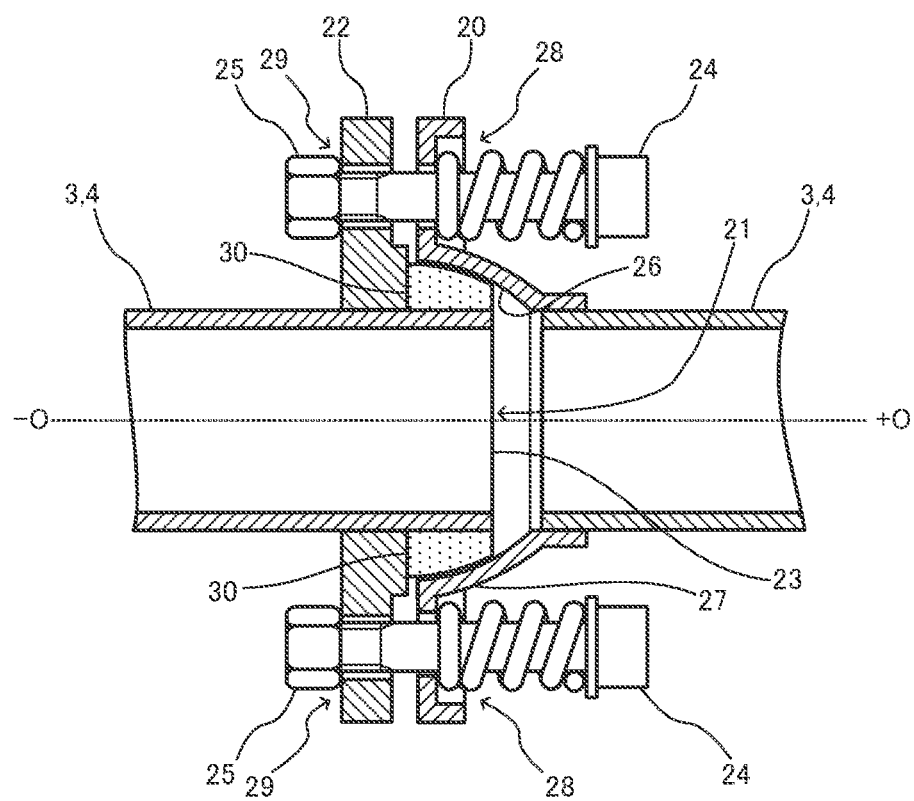
FIG. 2 is a cross-section view of a spherical joint 2.

FIG. 2 is a cross-section view showing a spherical joint 2 of one embodiment of the invention.

As shown in the figure, the spherical joint 2 comprises: an insertion opening 21, which is formed to go from a flange 20 attached to an end of one of two connection objects in connection with each other (a muffler 3 and an exhaust pipe 4, or two exhaust pipes 4) in the direction axially inwardly to the connection object in question (i.e. in the direction +O shown in FIG. 2), with this insertion opening 21 communicating with an exhaust path of the connection object in question; an insertion portion 23, which is an end of the other connection object to which a flange 22 is attached; and spring bolts 24 and nuts 25 for connecting the two connection objects.

In the flanges 20 and 22, are respectively formed bolt-holes 28 and 29. The spring bolts 24 each are threaded into the nuts 25 through these bolt-holes 28 and 29, to connect the two connection objects while biasing the insertion portion 23 in the direction of inserting the insertion portion 23 into the insertion opening 21.

In the insertion opening 21, is formed the spherical inner peripheral surface 26. A sliding member 30 of a tubular shape having the spherical outer peripheral surface 27 with a nearly same radius as that of the inner peripheral surface 26 of the insertion opening 21 is attached to the end of the connection object to which the flange 22 is fixed, to form thereby the insertion portion 23. The sliding member 30 is constructed to have a reinforcing member such as woven metallic wire and heat-resistant material such as expanded graphite. The inner peripheral surface 26 of the insertion opening 21 and the outer peripheral surface 27 of the sliding member 30 of the insertion portion 23 contact with each other, because the insertion portion 23 is biased by the spring bolts 24 and the nuts 25 in the direction of inserting the insertion portion 23 into the insertion opening 21. The maximum static friction force between the inner peripheral surface 26 of the insertion opening 21 and the outer peripheral surface 27 of the insertion portion 23 in contact with each other is determined by the friction characteristics of the inner peripheral surface 26 and the outer peripheral surface 27 and the biasing force of the spring bolts 24 and the nuts 25 (i.e. force of pressing the insertion portion 23 against the insertion opening 21).

In the spherical joint 2 shown in FIG. 2, the flange 20 with which the insertion opening 21 is formed integrally is attached to the end of one of the two connection objects in contact with each other (muffler 3 and exhaust pipe 4, or two exhaust pipes 4), and the flange 22 and the sliding member 30 as a component of the insertion portion 23 are attached to the end of the other connection object. The present invention, however, is not limited to this. For example, the flange 20 and the insertion opening 21 may be formed integrally with the end of one connection object. Further, the flange 22 and the insertion portion 23 may be formed integrally with the end of the other connection object.

Figure 3A:
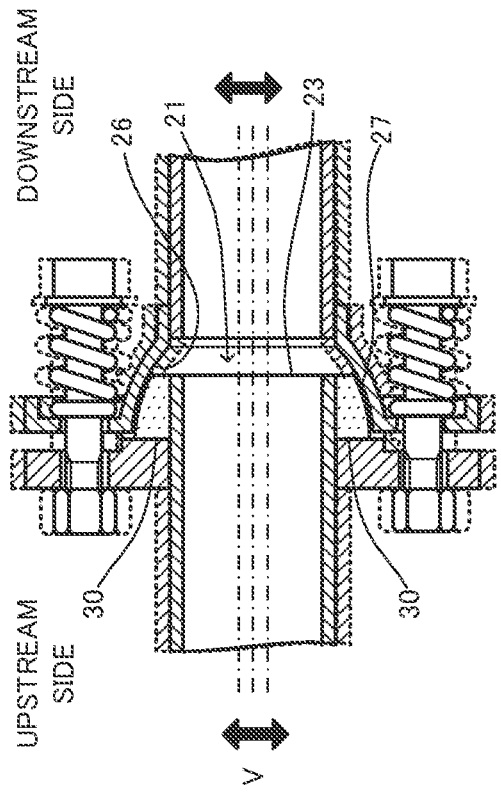
FIGS. 3(A) and 3(B) are views for explaining operating principle of the spherical joint 2.
Figure 3B:
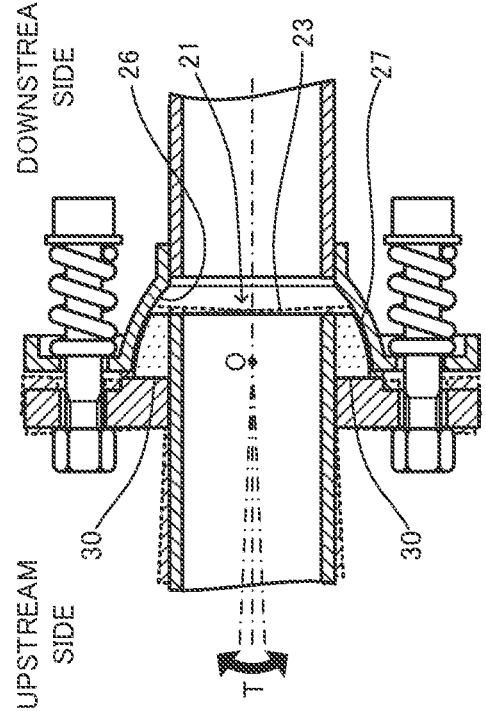

FIGS. 3(A) and 3(B) are views for explaining operating principle of each spherical joint 2.

As shown in FIG. 3(A), in a spherical joint 2, sliding is caused by generation of bending moment larger than or equal to the torque T (torque whose rotation center is the center O of the sphere defined by the inner peripheral surface 26) that generates the maximum static friction force between the inner peripheral surface 26 of the insertion opening 21 and the outer peripheral surface 27 of the sliding member 30 of the insertion portion 23, while these peripheral surfaces 26, 27 contact with each other. Because of this sliding, vibration transmitted from the upstream side of the spherical joint 2 (from the engine) to the downstream side (to the rear muffler 3b) is damped. On the other hand, as shown in FIG. 3(B), when the upstream side and the downstream side of the spherical joint 2 move parallel in the vertical direction, in the horizontal direction, or in the longitudinal direction synchronously with each other, sometimes there is not generated bending moment larger than or equal to the torque T such that the maximum static friction force is gene rated between the inner peripheral surface 26 of the insertion opening 21 and the outer peripheral surface 27 of the sliding member 30 of the insertion portion 23 in the spherical joint 2, even if the vibration V is large at the position where the spherical joint 2 is placed. In that case, the inner peripheral surface 26 of the insertion opening 21 and the outer peripheral surface 27 of the insertion portion 23 in the spherical joint 2 do not slide relative to each other. As a result, vibration on the upstream side of the spherical joint 2 is transmitted to the downstream side without being damped. Thus, the arrangement position determining method of the present embodiment determines, as arrangement positions of the spherical joints 2, positions at each of which bending moment is generated which is larger than or equal to the torque of generating the maximum static friction force between the inner peripheral surface 26 of the insertion opening 21 and the outer peripheral surface 27 of the sliding member 30 of the insertion portion 23 in the spherical joint 2 concerned when prescribed vibration (for example, vibration that is assumed of the engine to be mounted on the automobile or the like employing the exhaust system 1) is applied to the exhaust system 1.

Figure 4:
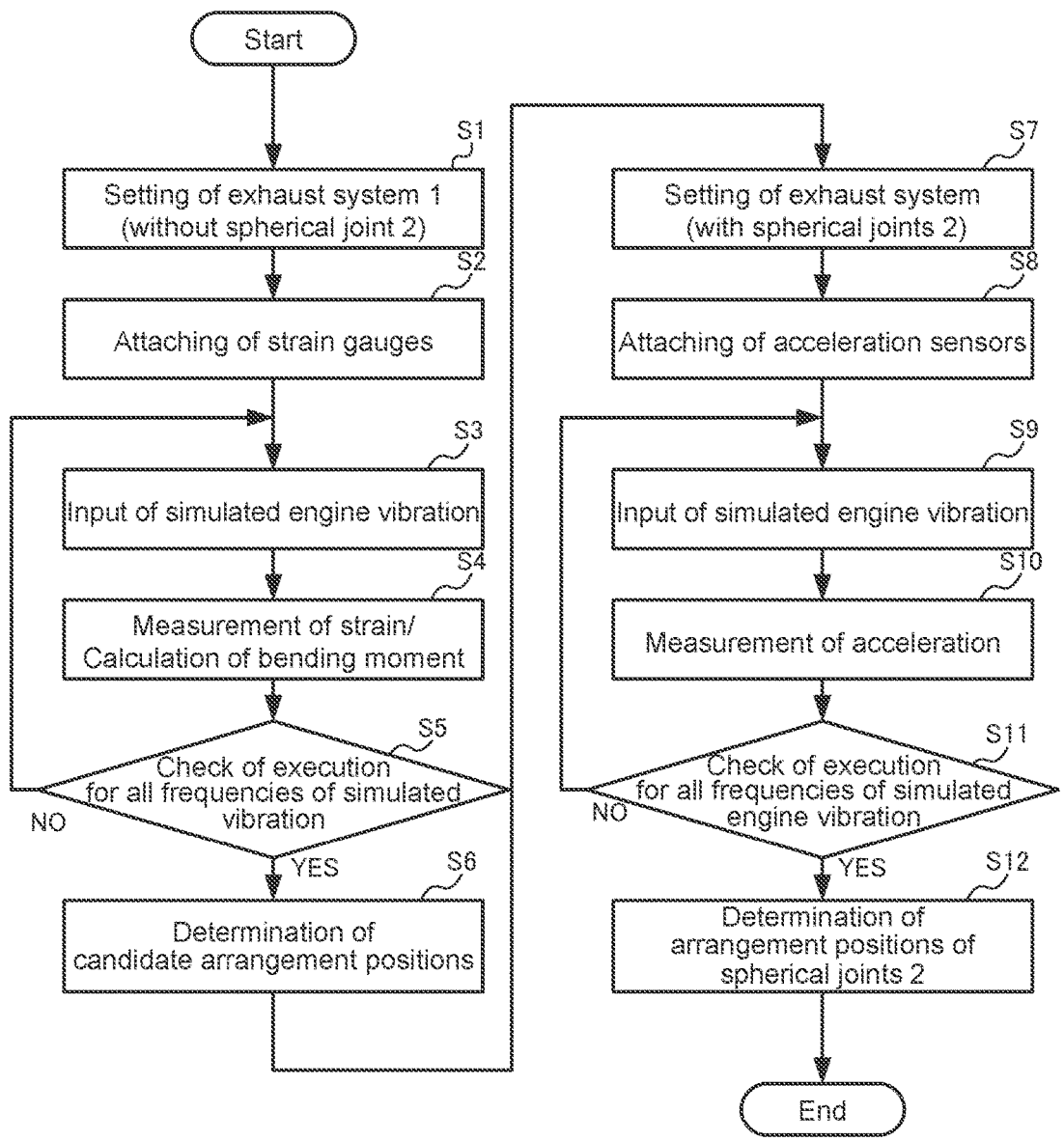
FIG. 4 is a flow diagram showing an arrangement position determining method according to one embodiment of the present invention.

FIG. 4 is a flow diagram showing the arrangement position determining method according to the present embodiment.

Step S1: Setting of the Exhaust System 1 (without Spherical Joint 2)

First, an exhaust system 1 having no spherical joint 2 is prepared. This exhaust system 1 with no spherical joint 2 may be an exhaust system 1 in which mufflers 3 and exhaust pipes 4 are formed integrally as one unit, or an exhaust system 1 in which positions between muffler 3 and exhaust pipe 4 and positions between exhaust pipes 4 are rigidly connected by the rigid coupling 5, the welding joint, or the like. Next, the exhaust system 1 is fixed to prescribed jigs via respective mounters (such as muffler hangers made of rubber) at the same positions as the positions where the mounters are to be placed when this exhaust system 1 is mounted on the body of the automobile or the like that employs the exhaust system 1. This represents the state in which the exhaust system 1 is mounted on the body of the automobile or the like.

Step S2: Attaching of Strain Gauges

In the exhaust system 1, strain gauges are attached to positions where spherical joints 2 can be placed, such as, for example, a position where a muffler 3 and an exhaust pipe 4 are connected, a position where exhaust pipes 4 are connected, and a position where an exhaust pipe 4 curves.

Step S3: Input of Simulated Engine Vibration

The vibration assumed of the engine scheduled to be mounted on the automobile or the like employing the exhaust system 1 is generated as simulated vibration of the engine. The generated vibration is inputted to the exhaust pipe 4a on the upstream side (on the side of the engine) of the exhaust system 1.

Step S4: Measurement of Strain and Calculation of Bending Moment

In the state that the simulated engine vibration is applied from the upstream side of the exhaust system 1, bending strains in the direction of the pipe axis at the positions where the spherical joints 2 can be placed are measured by the strain gauges attached at those positions. Then, for each of these positions where the spherical joints 2 can be placed, the bending moment is calculated using the measured bending strain and the section modulus and the Young's modulus of the muffler 3 or the exhaust pipe 4 located at that position.

Step S5: Check of Execution for All Frequencies of Simulated Engine Vibration

It is checked whether Steps S3 and S4 have been executed for all the frequencies of the simulated engine vibration, or, in detail, for all the frequencies selected at prescribed frequency intervals from the frequency band of the vibration assumed of the engine to be mounted on the automobile or the like employing the exhaust system 1. If Steps S3 and S4 have not been executed for all the frequencies of the simulated engine vibration ("NO" in Step S5), or in other words, if there is a frequency for which Steps S3 and S4 have not been executed, the processing returns to Step S3, and Steps S3 and S4 are executed for that frequency. If, on the other hand, Steps S3 and S4 have been executed for all the frequencies ("YES" in Step S5), the processing proceeds to Step S6.

Step S6: Determination of Candidate Arrangement Positions of Spherical Joints 2

Candidate arrangement position of the spherical joints 2 are determined based on the bending moments at respective positions where the spherical joints 2 can be placed, for each frequency of the simulated engine vibration. For example, for each frequency of the simulated engine vibration, a bending moment ratio is calculated at each of the positions where the spherical joints 2 can be placed, taking the maximum value of the bending moments as 1. Then, for each frequency of the simulated engine vibration, positions at which respective bending moment ratios are more than or equal to a prescribed value (for example 0.9) are determined to be the candidate arrangement positions of the spherical joints 2. At that time, the frequencies of the simulated vibration used for determining the candidate arrangement positions of the spherical joints 2 may be narrowed down based on the maximum bending moment values for respective frequencies of the simulated engine vibration (for example, the frequencies may be narrowed down in the order of the magnitude of the maximum bending moment values).

Step S7: Setting of the Exhaust System 1 (with Spherical Joints 2)

In the exhaust system 1 that has been assembled without the spherical joints 2 and fixed to the prescribed jigs via the respective mounters in Step S1 to represent the state of being mounted on the body of the automobile or the like, rigid coupling 5 is replaced by spherical joint 2 at each of the connecting positions determined as the candidate arrangement positions for the spherical joints 2 among the connecting positions between muffler 3 and exhaust pipe 4 and between exhaust pipes 4.

Step S8: Attaching of Acceleration Sensors

Acceleration sensor is attached to each of the mounters, which are used for fixing the exhaust system 1 to the prescribed jigs and placed at the same positions as the positions where the mounters are to be placed when the exhaust system 1 is mounted on the body of the automobile or the like employing the exhaust system 1.

Step S9: Input of Simulated Engine Vibration

The vibration assumed of the engine scheduled to be mounted on the automobile or the like employing the exhaust system 1 is generated as simulated engine vibration, and the generated simulated vibration is input to the exhaust pipe 4a on the upstream side of the exhaust system 1.

Step S10: Measurement of Acceleration

In the state that the simulated engine vibration is applied from the upstream side of the exhaust system 1, accelerations are measured by the acceleration sensors attached to the mounters for fixing the exhaust system 1 to the prescribed jigs.

Step S11: Check of Execution for All frequencies of Simulated Engine Vibration

It is checked whether Steps S9 and S10 have been executed for all the frequencies of the simulated engine vibration, or, in detail, for all the frequencies selected at prescribed frequency intervals from the frequency band of the vibration assumed of the engine to be mounted on the automobile or the like employing the exhaust system 1. If Steps S9 and S10 have not been executed for all the frequencies of the simulated engine vibration ("NO" in Step S11), or in other words, if there is a frequency for which Steps S9 and S10 have not been executed, the processing returns to Step S9, and Steps S9 and S10 are executed for that frequency. If, on the other hand, Steps 9 and S10 have been executed for all the frequencies ("YES" in Step S9), the processing proceeds to Step S12.

Step S12: Determination of Arrangement Positions of Spherical Joints 2

Arrangement positions of the spherical joints 2 are determined based on the measured values of the acceleration sensors at each frequency of the simulated engine vibration. For example, for each frequency of the simulated engine vibration, it is examined whether the measured values of the acceleration sensors are lower than or equal to a prescribed reference value. If the measured values of the acceleration sensors are lower than or equal to the prescribed reference value, it is considered that: there is generated bending moment larger than or equal to the torque of generating the maximum static friction force between the spherical inner and outer peripheral surfaces 26 and 27 in contact with each other of the spherical joint 2 placed at each candidate arrangement position; the inner peripheral surface 26 and the outer peripheral surface 27 slide relative to each other; and as a result vibrations transmitted from the exhaust system 1 to the prescribed jigs via the mounters are reduced. Accordingly, for each frequency of the simulated engine vibration, the candidate arrangement positions are determined to be arrangement positions of spherical joints 2, if the measured values of the acceleration sensors are lower than or equal to the prescribed reference value.

Hereinabove, one embodiment of the present invention has been described.

According to the present embodiment, strain gauges are attached to a plurality of positions on the exhaust system 1; simulated engine vibration is applied on the upstream side of the exhaust system 1 for each frequency of the simulated engine vibration; based on the bending strains in the pipe axis direction measured at that time by respective strain gauges, is detected a position at which generated is the bending moment larger than or equal to the torque of generating the maximum static friction force between the spherical inner and outer peripheral surfaces 26 and 27 in contact with each other as components of the spherical joint 2; and the detected positions are determined to be arrangement positions of spherical joints 2. Accordingly, it is possible to gene rate much sliding between the inner peripheral surface 26 and the outer peripheral surface 27 of each spherical joint 2 placed in the exhaust system 1, so that acceleration transmitted from the engine to the exhaust system 1 can be reduced and frequencies of the vibration of the exhaust system including the engine can be shifted. Thus, it is possible to reduce more efficiently the vibrations transmitted from the engine to the body via the exhaust system, and at the same time it is possible to shift vibrations of frequencies uncomfortable to passengers to vibrations of frequencies that the passengers do not feel uncomfortable.

The present invention is not limited to the above-described embodiment, and can be changed within the scope of the invention.

For example, in the above embodiment, an arrangement position of spherical joint 2 is determined as a position at which generated is bending moment larger than or equal to the torque of generating the maximum static friction force between the inner peripheral surface 26 and the outer peripheral surface 27 of the spherical joint 2 when the simulated engine vibration is applied to the upstream end of the exhaust system 1 for each of the frequencies of the simulated engine vibration (in detail, frequencies selected at the prescribed frequency intervals from the frequency band of the vibration supposed of the engine to be mounted on the automobile or the like employing the exhaust system 1). The present invention is not limited to this. In the present invention, it is sufficient that an arrangement position of spherical joint 2 is determined as a position at which generated is bending moment larger than or equal to the torque of generating the maximum static friction force between the inner peripheral surface 26 and the outer peripheral surface 27 of spherical joint 2 when prescribed vibration (for example, any vibration supposed of the engine to be mounted on the automobile or the like employing the exhaust system 1) is applied from the engine to the exhaust system 1.

Further, in the above embodiment, the strain gauges are attached to a plurality of positions of the exhaust system 1; prescribed vibration is applied to the upstream end of the exhaust system 1; and based on the respective bending strains in the pipe axis direction measured by the strain gauges at that time, a position is detected at which generated bending moment larger than or equal to the torque of generating the maximum static friction force between the inner peripheral surface 26 and the outer peripheral surface 27 of spherical joint 2. The present invention is not limited to this. For example, Computer Aided Engineering (CAE) analysis may be employed to obtain a stress distribution at the time of applying prescribed vibration to the upstream end of the exhaust system 1, so that a position is detected at which generated is bending moment larger than or equal to the torque of generating the maximum static friction force between the inner peripheral surface 26 and the outer peripheral surface 27 of spherical joint 2. For example, the candidate arrangement positions of the spherical joints 2 may be determined as follows. In Steps S2-S5 of FIG. 4, a stress distribution of the spherical joints 2 is obtained by CAE analysis for each frequency of the simulated engine vibration, and the bending moment at each of the positions where the spherical joints 2 can be placed is calculated based on the obtained stress distribution. Then, the bending moment ratio is calculated at each of the positions where the spherical joints 2 can be placed, taking the maximum value of the bending moments as 1. Then, the candidate arrangement positions of the spherical joints 2 are determined as points each with the bending moment ratio larger than or equal to a prescribed value (for example, 0.9), for each frequency of the simulated engine vibration.

REFERENCE SIGNS LIST

1: exhaust system; 2: spherical joint; 3a: center muffler; 3b: rear muffler; 4a-4d: exhaust pipe; 5: rigid coupling; 20, 22: flange; 21: insertion opening; 23: insertion portion; 24: spring bolt; 25: nut; 26: spherical inner peripheral surface; 27: spherical outer peripheral surface; 28, 29: bolt-hole; and 30: sliding member.

The invention claimed is:

1. A method of determining arrangement position of spherical joint that connects exhaust pipes to each other in exhaust system for discharging exhaust gas of an engine, comprising:
   detecting a position in the exhaust system, a spherical inner peripheral surface and a spherical outer peripheral surface being components of the spherical joint, a bending moment at the position being generated larger than or equal to a torque of generating a maximum static friction force between the spherical inner peripheral surface and the spherical outer peripheral surface in contact with each other upon prescribed vibration being applied to an upstream end of the exhaust system; and
   determining the detected position to be the arrangement position of the spherical joint in the exhaust system, wherein:
   strain gauges are attached to a plurality of portions of the exhaust system; and the position, at which generated is the bending moment larger than or equal to the torque of generating the maximum static friction force between the spherical inner peripheral surface and the spherical outer peripheral surface that are components of the spherical joint and contact with each other, is detected based on bending strains measured by the respective strain gauges when simulated vibration that simulates vibration of the engine is applied to an upstream end of the exhaust system.

2. A method of determining arrangement position of spherical joint that connects exhaust pipes to each other in exhaust system according to claim 1, wherein:
   when, for each frequency of the simulated vibration of the engine, the simulated vibration of the engine is applied to the upstream end of the exhaust system, the position is detected in the exhaust system at which generated is the bending moment larger than or equal to the torque of generating the maximum static friction force between the spherical inner peripheral surface and the outer peripheral surface that are components of the spherical joint and contact with each other.

3. A method for manufacturing an exhaust system for discharging exhaust gas of an engine, the exhaust system including multiple exhaust pipes and at least one spherical joint that connects the exhaust pipes to each other, said method comprising:
   determining an arrangement position of the spherical joint according to the method of claim 1; and
   manufacturing the exhaust system with the spherical joint arranged in the position as determined.

4. A method of determining arrangement position of spherical joint that connects exhaust pipes to each other in exhaust system for discharging exhaust gas of an engine, comprising:
   detecting a position in the exhaust system, a spherical inner peripheral surface and a spherical outer peripheral surface being components of the spherical joint, a bending moment at the position being generated larger than or equal to a torque of generating a maximum static friction force between the spherical inner peripheral surface and the spherical outer peripheral surface in contact with each other upon prescribed vibration being applied to an upstream end of the exhaust system; and
   determining the detected position to be the arrangement position of the spherical joint in the exhaust system, wherein:
   Computer Aided Engineering (CAE) analysis is used to obtain a stress distribution at a time of applying simulated vibration that simulates vibration of the engine to the upstream end of the exhaust system; and the position, at which generated is the bending moment larger than or equal to the torque of generating the maximum static friction force between the spherical inner peripheral surface and the outer peripheral surface that are components of the spherical joint and contact with each other, is detected based on the obtained stress distribution.

5. A method of determining arrangement position of spherical joint that connects exhaust pipes to each other in exhaust system according to claim 4, wherein:
   when, for each frequency of the simulated vibration of the engine, the simulated vibration of the engine is applied to the upstream end of the exhaust system, the position is detected in the exhaust system at which generated is the bending moment larger than or equal to the torque of generating the maximum static friction force between the spherical inner peripheral surface and the outer peripheral surface that are components of the spherical joint and contact with each other.

6. A method for manufacturing an exhaust system for discharging exhaust gas of an engine, the exhaust system including multiple exhaust pipes and at least one spherical joint that connects the exhaust pipes to each other, said method comprising:

determining an arrangement position of the spherical joint according to the method of claim 4; and manufacturing the exhaust system with the spherical joint arranged in the position as determined.

\* \* \* \* \*